Sept. 1, 1959  R. C. OAKLEY  2,902,067
RECIPROCATING SAW
Filed April 22, 1957  2 Sheets-Sheet 1
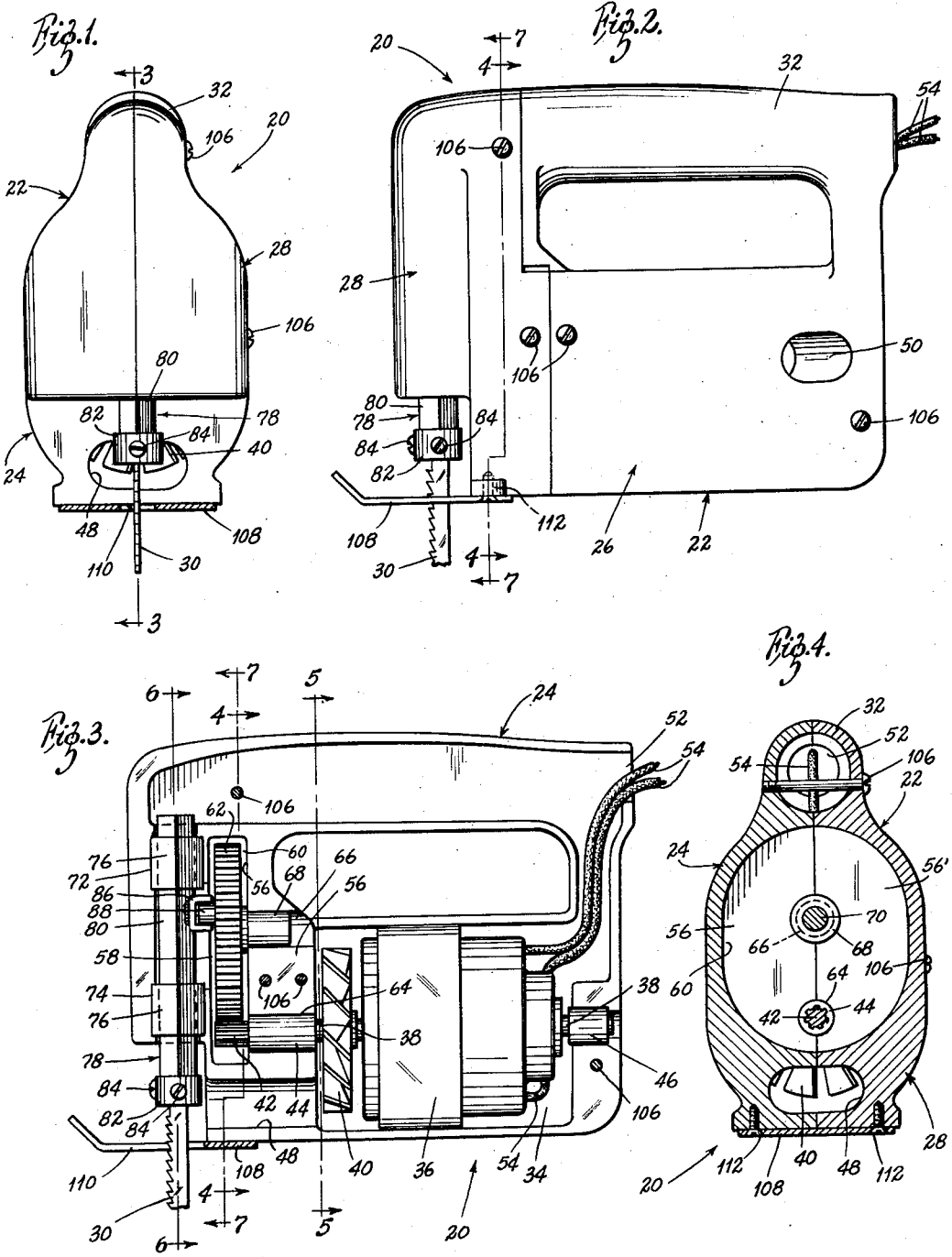
INVENTOR:
RICHARD C. OAKLEY,
BY Kingsland, Rogers & Ezell
ATTORNEYS

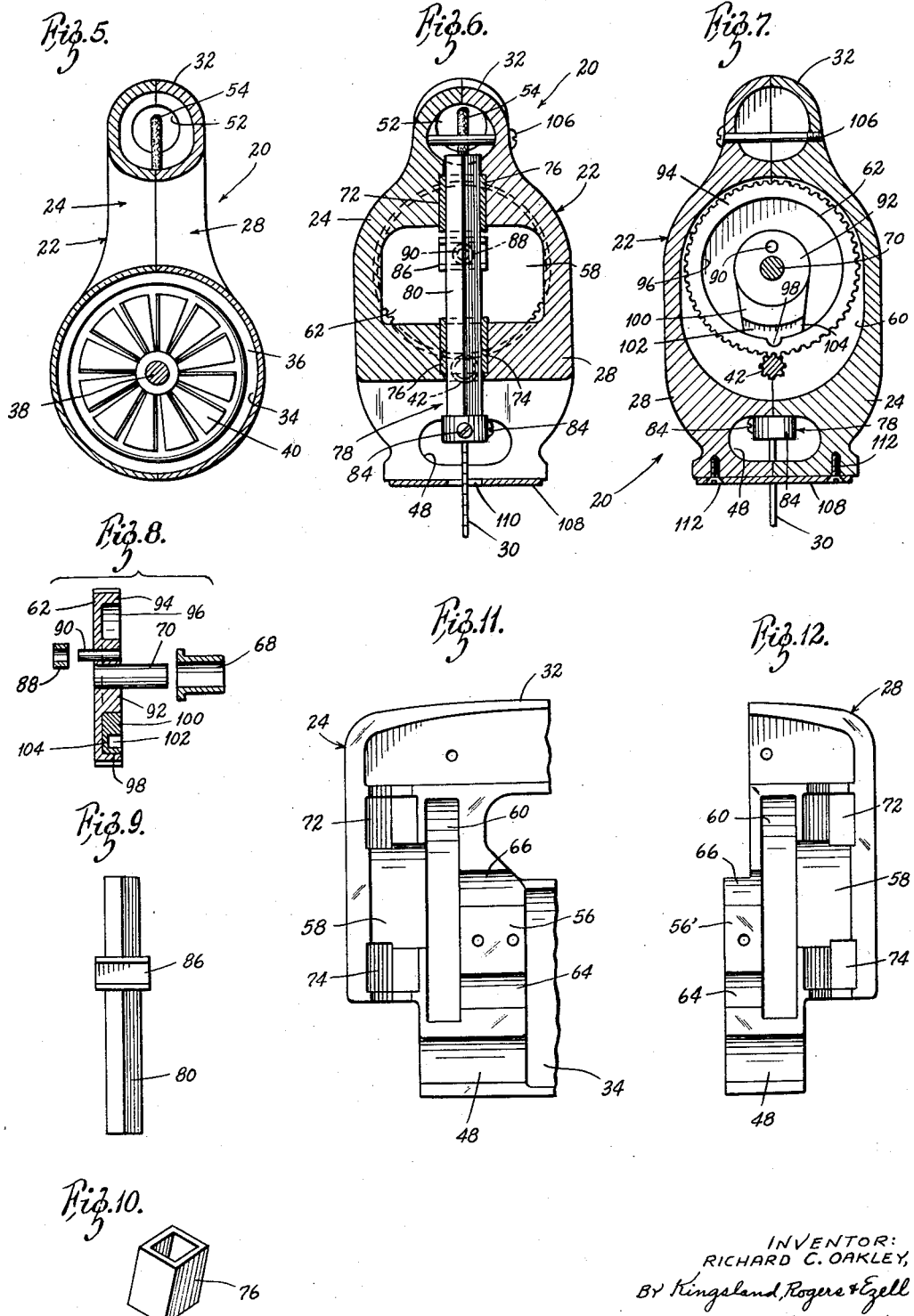

United States Patent Office 2,902,067
Patented Sept. 1, 1959

2,902,067

RECIPROCATING SAW

Richard C. Oakley, St. Louis, Mo., assignor to Oakley Products Company, St. Louis, Mo., a corporation of Missouri Application April 22, 1957, Serial No. 654,305

1 Claim. (Cl. 143—68)

The present invention relates generally to power driven hand tools, and more particularly to a power driven saw which incorporates novel driving mechanism for reciprocating a saw blade.

Despite the obvious problems of vibration and wear in reciprocating mechanisms, it not infrequently happens that such a movement provides a degree of mechanical efficiency or an extent of useful versatility that is quite beyond an alternative movement—such as simple rotation, for example. A case in point is that of power driven hand saws of the reciprocating type. Among the advantages which accrue to this type of saw, as compared to saws provided with rotating circular blades, are the possibility of deeper cuts with a tool of conveniently portable size, the ability to saw along other than generally straight paths, and the characteristic of sawing to a vertical plane.

The present invention has for its general object, therefore, the improvement of reciprocating saws in the areas that have been demonstrated by past experience to be most critical, namely, in supporting the reciprocating parts and in counterbalancing the rotating parts which drive the reciprocating parts.

In keeping with this general objective, it is a further object of the invention to provide a reciprocating hand saw of exceptionally simple, light-weight, and compact arrangement.

It is another object of the invention to provide a novel reciprocating saw which incorporates a single driven gear provided with a lead counterweight.

It is another object of the invention to provide an improved bearing arrangement for a reciprocating blade assembly.

It is another object of the invention to provde a reciprocating assembly retained in rectangular bearings.

The foregoing, along with additional objects and advantages, will be apparent from the following description of a specific embodiment of the invention, as illustrated in the accompanying drawings, in which:

Figure 1 is a front elevation of a reciprocating saw conforming to the present invention;

Figure 2 is a side elevation thereof;

Figure 3 is a side elevation similar to Figure 2, but with the near half of a split casing removed in order better to illustrate the over-all arrangement of moving parts;

Figure 4 is a vertical section taken generally along the lines 4—4 of Figures 2 and 3;

Figure 5 is a vertical section taken generally along the line 5—5 of Figure 3;

Figure 6 is a vertical section taken generally along the line 6—6 of Figure 3;

Figure 7 is a vertical elevation taken generally along the lines 7—7 of Figures 2 and 3;

Figure 8 is an exploded sectional view showing a driven gear, along with parts normally carried on the same;

Figure 9 is an elevational view of a reciprocating shaft;

Figure 10 is an isometric view of a rectangular bearing;

Figure 11 is a fragmentary vertical elevation showing the inside form of a casing member; and Figure 12 is a vertical elevation showing the inside of another casing member which cooperates with the casing member of Figure 11 to contain mechanism for converting rotary motion to reciprocatory motion.

Directing attention more particularly to the details of the drawing as indicated by reference characters, the numeral 20 indicates generally a reciprocating saw constructed in conformance with the teachings of the present invention. The saw 20 has a hollow frame or casing 22 formed on a split pattern wherein a casing member 24 serves as one half of the housing and casing members 26 and 28 cooperate to form the remaining half.

As best shown in Figures 1 and 2, the casing or housing 22 fully encloses all moving parts of the saw 20 except for a portion of the reciprocating assembly which includes a saw blade 30. An upper portion of the casing 22 serves as a handle 32 by means of which an operator may carry the saw or control its movement in a sawing operation.

As is clear from Figure 3, the lower portion of the casing 22 is formed to provide a recess 34 for accommodation of an electric motor 36. The motor 36 may be of any type which is adapted for the intended purpose. Preferably, it has an armature shaft 38 provided with a cooling fan 40 and extended forwardly beyond the fan 40 to terminate in an integral pinion gear 42. The shaft 38 is supported in sleeve bearings 44 and 46 retained in conventional manner, as illustrated, within the split housing 22.

The chamber 34 within which the motor 36 is disposed in ventilated by means of apertures formed in the housing 22 so as to communicate the chamber 34 with the outside of the saw 20. Thus, there is a main forward aperture 48 formed cooperatively in the casing members 24 and 28. It will be noted that the location of the aperture 48 is opposite the lower portion of the fan 40 and arranged so that air delivered from the fan 40 will be directed generally toward the upper portion of the saw blade 30. At the opposite end of the chamber 34, apertures 50 are provided in each of the casing members 24 and 26 laterally of the rear motor bearing 46. Another aperture, 52, is provided at the rear end of the handle portion 32 to serve as an opening through which power leads 54 may be brought out from the housing 22 for connection to a suitable electric supply.

Referring once more to Figure 3, it will be observed that the forward end of the motor chamber 34 is defined by a wall 56 which also defines the rear end of a transmission chamber 58. Figure 11 shows this portion of the casing with the moving parts removed, and Figure 12 shows the member 28 to have a rear wall 56' which corresponds to the wall 56 of the member 24. The casing members 24 and 28, forwardly of their respective walls 56 and 56', are identical with each other, except for being of opposite hand.

Considering the illustrations of Figures 11 and 12, together, the transmission chamber 58 defined cooperatively between the members 24 and 28 includes a disc-like recess 60 for accommodation of a driven gear 62, shown in the assembly of Figure 3 and shown removed in Figure 8. The gear 62 meshes with the aforementioned pinion 42 and both of these gear members are supported in the wall 56, 56'. Thus, a bearing seat 64 is provided for accommodation of the previously mentioned sleeve bearing 44, and a seat 66 is provided to receive a flanged sleeve bearing 68 which accommodates a stud shaft 70 fixed to the gear 62 as best shown in Figure 8.

Just forwardly of the gear cavity 60, the transmission chamber 58 is provided with upper and lower bearing recesses 72 and 74 for accommodation of rectangular sleeve bearings 76. The bearings 76, one of which is shown removed in Figure 10, are retained in vertical alignment in the recesses 72 and 74 and together receive a reciprocating assembly 78.

The reciprocating assembly 78 comprises an elongated shaft 80 of rectangular cross section adapted to slide within the bearings 72 and 74. The lower end of the shaft 80 is turned to cylindrical shape and is slotted to receive the upper end of the saw blade 30. A collar 82, along with set screws 84, is provided to retain the saw blade 30 in conventional manner. The shaft 80 may be for the most part hollow in order to lighten it.

At an intermediate point along the reciprocating shaft 80, a slotted crosshead 86 is secured in the position clearly illustrated in Figures 3 and 9. The crosshead 86 takes the form of a channel and is therefore enabled to slidably receive a collar 88 which is rotatably mounted on an eccentric pin 90 secured in the gear 62 as is clear from Figure 8.

Directing attention now particularly to the gear 62 as illustrated in Figures 7 and 8, a central boss 92 is coaxial with the stud shaft 70 and accommodates the eccentric pin 90. The gear teeth are formed in an outer rim 94, and an annular recess 96 is provided between the boss 92 and the rim 94. A notch 98 is formed at the inside of the rim 94 to extend the full depth of the annular recess 96, this notch 98 being located in a plane which extends through the axes of both the eccentric pin 90 and the stud shaft 70 and, at the same time, remote from the eccentric pin 90. A counterweight 100 occupies a segmental area between the boss 92 and the rim 94 as illustrated in Figure 7, and it will be evident that the counterweight 100 is retained in interlocked relationship with the gear 62 by virtue of the notch 98 and the convex shape of the boss 92. The counterweight 100 is preferably of metal having a low melting point, such as lead, for example, and is initially deposited in the recess 96 so as to fill the segmental portion previously mentioned. Subsequently, a portion of the counterweight 100 is removed in any appropriate manner so as to form a notch or slot 102 therein. It will be noted from Figures 7 and 8, however, that the counterweight material is left in the notch 98 and a connecting portion 104 is left at the bottom of the notch 102 to provide a connection between the material in the notch 98 and the main body of the counterweight 100 which remains juxtaposed with the boss 92.

*Operation*

With the moving parts assembled in the manner illustrated in Figure 3, and with the casing 22 fixed in place by means of appropriate screws 106, the reciprocating saw 20 comprises a compact tool of convenient size and shape as clearly illustrated in Figures 1 and 2. A guide plate 108 provided with a longitudinal slot 110 is secured by means of screws 112 to the underneath surfaces of the casing members 24 and 28. The forward end of the guide plate 108 is laid upon the upper surface of a piece of wood or the like to be cut, and the tool 20 is advanced by the operator in the direction along which the cut is to be made. Clearly, the rotating armature of the motor 36 causes the pinion 42 to drive the gear 62 so that the Scotch yoke arrangement of the eccentric pin 90 and its collar 88 with the crosshead 86 affixed to the rectangular shaft 80 is enabled to reciprocate the latter with its attached saw blade 30.

It is understood, of course, that the saw blade 30 is of a type frequently used in jig saws and the like in that it has a relatively small depth backing up the teeth. Thus, it is well adapted to be directed along a curved path as it saws its way through a board or the like. The twisting forces resulting from directing the saw blade 30 along such a path are, of course, conveyed to the rectangular shaft 80 and are eventually absorbed in the flat planar bearing surfaces at the interior of the rectangular bearings 76. The arrangement is clearly one which provides an efficient slide bearing arrangement having exceptionally long life and being inherently adapted to overcome any tendency of the saw blade to wander or to rotate as a result of wear.

The ventilating arrangement previously described for the motor 36 is such that air drawn by means of the fan 40 through the rear openings 50 and 52 of the casing 22, passes through the motor 36 and is finally exhausted through the forward aperture 48 directly behind the reciprocating saw blade 30. As the air is blown forwardly, it serves to keep the area about the blade 30 free of an accumulation of sawdust, thereby making it easier to follow a line previously drawn upon the workpiece.

The effect of the counterweight 100 is, of course, to balance the reciprocating assembly 78 in its effect upon the rotating gear 62. The previously described method of emplacing and sizing the counterweight 100 enables an accurate dynamic balance to be quickly and easily obtained in production of the tool 20.

Clearly, there has been provided a reciprocating saw which fulfills the objects and advantages sought therefor.

It is to be understood that the foregoing description and the accompanying drawings have been given only by way of illustration and example. It is further to be understood that changes in the form of the elements, rearrangement of parts, and the substitution of equivalent elements, all of which will be apparent to those skilled in the art, are contemplated as being within the scope of the present invention, which is limited only by the claim which follows.

What is claimed is:

A reciprocating saw comprising, in combination, a hollow casing, an electric motor having a rotatable shaft in said casing, a reciprocable shaft of rectangular cross section mounted in the casing perpendicular to the axis of the rotatable motor shaft, a toothed blade secured to and in extension of said reciprocating shaft, said blade being disposed with the line of cut coincident with a diagonal of said rectangular shaft, means in the casing interconnecting said motor shaft and said reciprocable shaft for reciprocation of the latter, and a pair of rectangular sleeve bearings mounted in the casing guidingly receiving the reciprocable shaft, said bearings being spaced apart, and bearings being disposed with diagonals thereof coincident with the cutting plane of the toothed blade.

References Cited in the file of this patent

UNITED STATES PATENTS

| 1,707,097 | Ruschke | Mar. 26, 1929 |
| 2,282,728 | Kern | May 12, 1942 |
| 2,610,524 | Maust | Sept. 16, 1952 |
| 2,639,737 | Forsberg | May 26, 1953 |
| 2,704,941 | Holford | Mar. 29, 1955 |
| 2,808,082 | Moretti et al. | Oct. 1, 1957 |